United States Patent Office 3,498,441
Patented Mar. 3, 1970

3,498,441
POSITIONING DEVICE FOR CONVEYED ARTICLES
Albert D. Furedy, Pittsburgh, Pa., and Stephen Stevens, Crystal City, Mo., assignors to PPG Industries Inc., a corporation of Pennsylvania
Filed Mar. 28, 1968, Ser. No. 716,837
Int. Cl. B65g 47/22
U.S. Cl. 198—29          6 Claims

ABSTRACT OF THE DISCLOSURE

A glass-positioning apparatus having a shaft mounted transversely over a conveyor belt; a plurality of positioning fingers mounted on the shaft; a cam and cam follower and linkage to turn the shaft about its axis and bring the fingers into contact with the glass sheet beneath, all mounted on a movable bridge over the conveyor; a source of power; a one revolution clutch connected to that source; an eccentric arm and rod connecting the clutch to the bridge so that the bridge reciprocates along the conveyor and the fingers sweep along the belt at a greater speed than the belt and position the glass thereon.

---

This invention relates to apparatus for positioning glass on a conveyor belt. In glassmaking, individual sheets of glass are formed from continuous ribbons of glass and the sheets are conveyed forward on a conveyor system to a process station where the sheets are picked from the line and packaged in pallets or other small parcels.

An increase in the rate of production of the primary glass ribbon has necessitated an increase in the speed of the conveyor system in order to automatically remove the severed glass from the various process stations. These recent advances have made mandatory the automatic packaging of the glass sheets. It is now virtually impossible for hand labor to remove and package glass from the conveyor line in the volume needed for the efficient utilization of the packaging machines. The apparatus of this invention is an efficient device for positionnig glass on the conveyor belt. It has virtually eliminated bottlenecks associated with the packaging of glass using automatic packaging equipment. A full and complete understanding of the invention may be had by referring to the accompanying drawings and the description herein.

Figure 1:
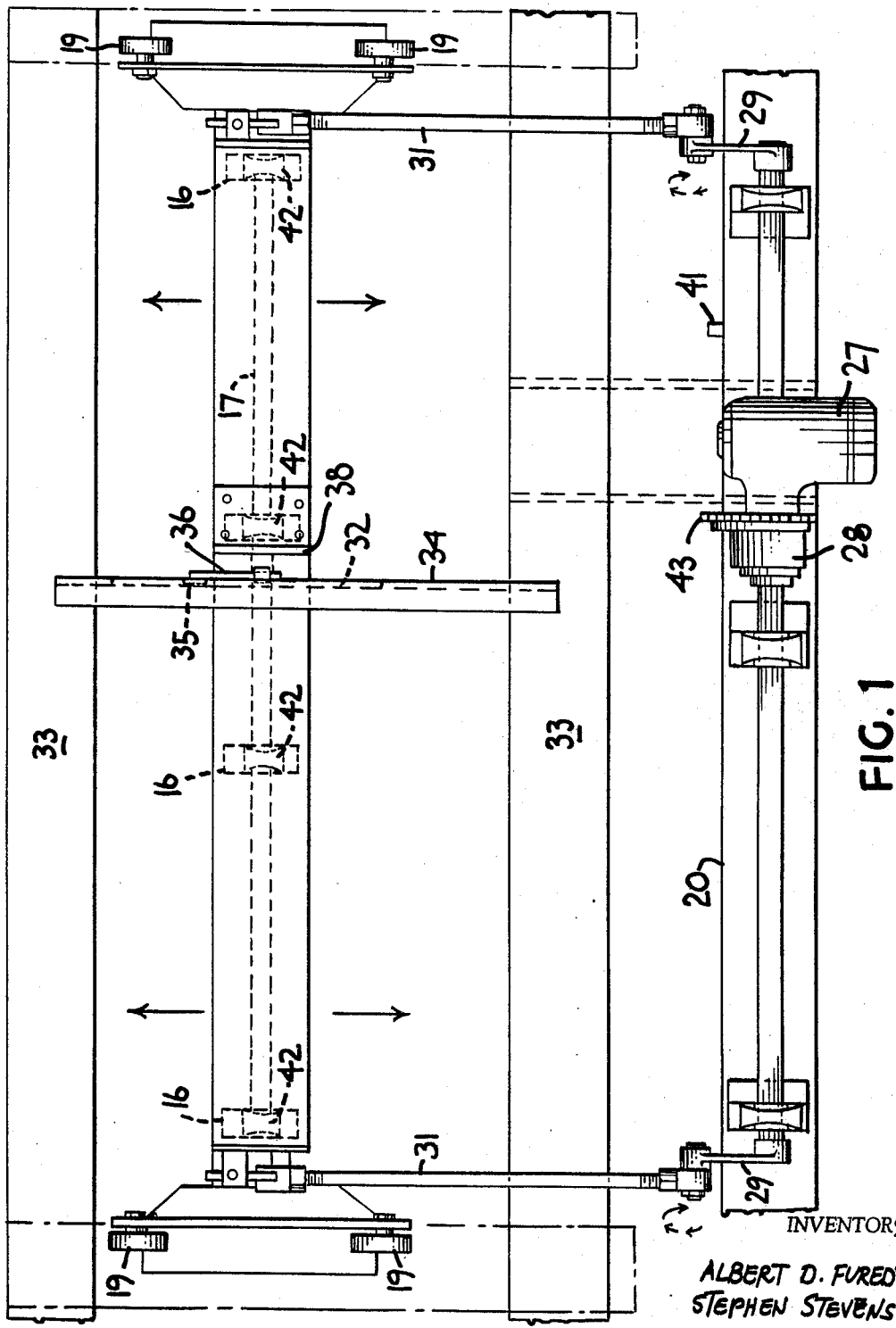
Figure 2:
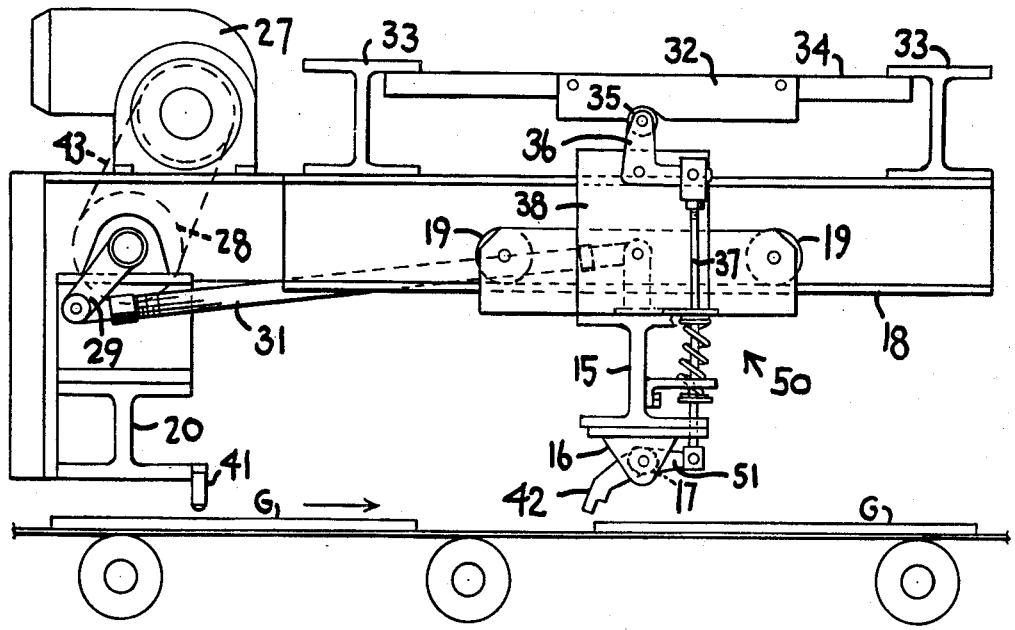
Figure 3:
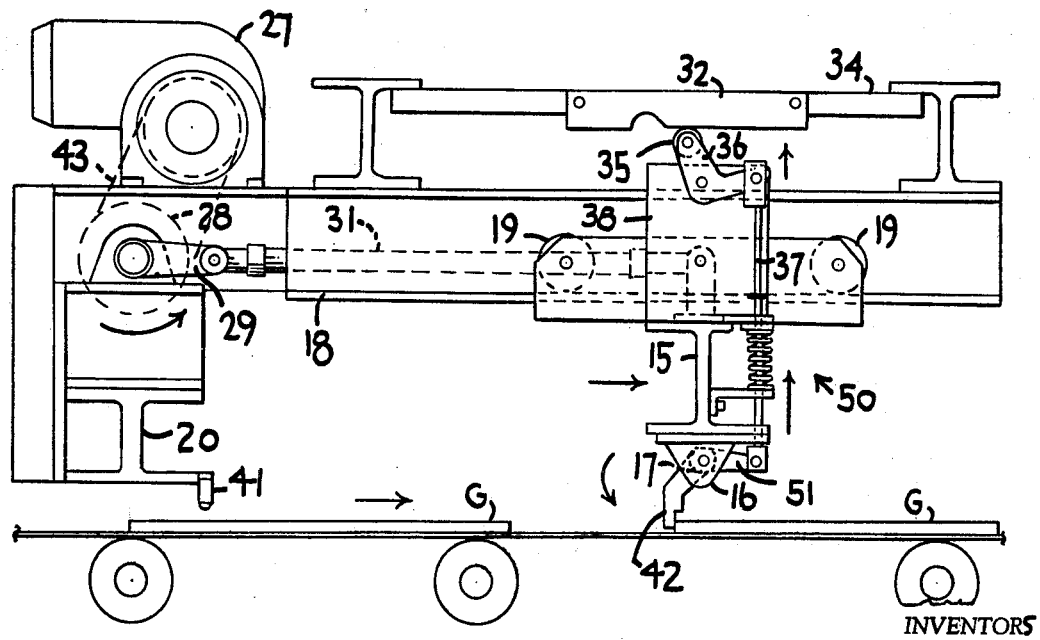

FIG. 1 is a top plan view of the squaring device;
FIG. 2 is a side view of the squaring device;
FIG. 3 is a side view of the squaring device in the activated position.

The assembly comprises a one-revolution clutch, driven by a motive power means; a movable positioning bridge; and positioning fingers. The bridge is connected to the clutch and reciprocates along the direction of glass travel. The active assembly moves along at a slightly faster speed than the glass on the belt. The result is a sweeping motion which, when imparted to the glass by the positioning fingers, serves to position the glass on the belt.

A supporting beam 15 spans the conveyor and has a plurality of supporting bushings or bearings 16 placed at intervals along the length of the beam. The common shaft 17 is mounted through the bearings. The supporting beam 15 is movably mounted to a pair of parallel I beams or channel irons 18 which are parallel to the path of conveyor travel. The supporting beam is directly connected to the channel by a supporting assembly having wheels 19 which are movable along the channels of the beam. The entire assembly of fingers, shaft, and supporting beam is movable back and forth in the direction of glass travel relative to the conveyor. A second supporting beam 20 is mounted across the conveyor and upstream of the first supporting beam and provides a support assembly for a motor and drive train comprising a one-revolution clutch and crank arms connected to the clutch by a common motor-driven shaft. The crank arms 29 drive connecting rods 31 which connect the crank arms to the supporting beam assembly 15. Rotary movement from the motor 27 turns the one-revolution clutch 28, which in turn drives the crank arms 29 and imparts a reciprocating movement from the support bridge back and forth along the direction of conveyor travel. A cam 32 is positioned on a beam 34 positioned between beams 33 along the center of the conveyor. A cam follower 35 and an associated linkage means 50 is mounted on the movable support beam 15. The linkage is connected between the common shaft 17 and the cam follower 35. The cam follower 35 is connected to a bell-crank arm 36 which is pivotally mounted to a supporting plate 38. The connecting linkage 50 comprises a crank arm 36, a connecting rod 37 which is mounted vertically in relation to the conveyor, and a lever arm 51 which is movably mounted to the connecting rod and pivotally mounted to the supporting assembly and turns the common shaft 17 along its axis. A moving glass sheet G actuates switch 41 as shown in schematic FIG. 2. The one-revolution clutch 28 drives the connecting rod 31 and quickly pushes the beam 15 in the direction of glass travel and at a faster rate than the glass. As the cam follower 35 moves across the cam 32 and the follower is rotated about its pivot, this action moves the connecting rod 37 quickly vertically upward. The upward movement of the rod turns the common shaft 17 counter-clockwise and the turning of the common shaft moves the fingers 42 very quickly into a vertical position along the surface of the conveyor. The fingers connect the edge of the moving glass piece as shown in schematic FIG. 3, and the faster rate of movement of the fingers snaps the glass into a position which is squared with the conveyor belt. The limit switch 41 activates the bridge 15 and the bridge is pulled upstream towards its home position by the continued action of the one-revolution clutch. The cycle can be endlessly repeated by succeeding pieces of glass as they trigger the limit switch 41.

A fixed cam 32 has a shaped cam surface and is positioned on a permanently located support 34 positioned between cross beams 33. The shaped surface is designed to activate cam follower 35, and as the cam follower moves downstream with the glass travel, the follower is rotated and the connecting linkage turns the fixed shaft, having the fingers into the contacted position.

A motive power system, such as an electric motor 27 is connected to a single-turn clutch 28 by chain drive 43. The shaft connects the clutch 28 and a reciprocating arm so that when the single-turn clutch 28 makes one-half revolution the result is to cause a reciprocating motion at the end of the shaft. A connecting rod is placed between the end of the shaft and the moving beam. Hence, every half turn of the shaft causes the beam to move forward and then the next half turn returns it to a fixed home position.

The apparatus of this invention provides means for positioning glass so that subsequent placed equipment can pick the glass off the conveyor for packaging.

What is claimed is:
1. A device for positioning glass on a conveyor comprising:
(a) a supporting beam disposed transversely across the conveyor and movable along a fixed channel in the direction of glass travel;
(b) reciprocating means connected to said support beam for moving the beam back and forth along the direction of conveyor travel;

(c) a common shaft rotatably mounted along the said supporting beam transversely of said conveyor;
(d) a plurality of positioning fingers mounted along said shaft;
(e) a fixed cam disposed above said conveyor and in a fixed position relative to the movable supporting beam;
(f) a cam follower fixed on the supporting beam and in engagement with said cam;
(g) a linkage connecting the shaft and the cam follower whereby the reciprocating motion of the supporting beam causes the cam follower to activate the linkage and impart a rotating motion about the axis of the shaft thus turning the positioning fingers through a quarter turn.

2. A device for positioning glass relative to its conveyor belt comprising:
(a) a bridge transversing said conveyor and movable along the direction of conveyor travel;
(b) a shaft spanning the conveyor and rotatably mounted along its axis;
(c) a cam fixed to said channel;
(d) a cam follower positioned on said beam;
(e) a bell crank connected to said shaft;
(f) a linkage connected to the cam follower and the bell crank whereby the motion of the cam follower causes the shaft to turn about its long axis and to move the positioning fingers closer to the conveyor and contacting passing glass, the movement of the fingers correlated with the reciprocating motion of the supporting beam sweeping along said conveyor in the direction of glass travel at a speed in excess of the conveyor speed thus engaging and thereby positioning said glass relative to said conveyor line.

3. Apparatus for positioning conveyed objects on a conveyor system comprising:
(a) a fixed cam fixedly mounted on a beam over the conveyor;
(b) a supporting bridge movable on the beam along the longitudinal axis of the conveyor;
(c) a cam follower mounted on the supporting bridge and contacting said cam;
(d) positioning fingers mounted on a transverse shaft journaled on the supporting bridge;
(e) a connecting linkage connecting said cam follower and said positioning fingers.

4. Apparatus for positioning objects while being conveyed relative to their conveyor comprising:
(a) a support disposed over said conveyor and movable on a channel relative to a home position and a contacting position;
(b) a positioning assembly on said support and disposed over said conveyor and contactable to said conveyed object;
(c) a reciprocating means connected to said support for driving it in the direction of conveyor travel at a speed greater than the conveyed object;
(d) cam means fixed to the channel for actuating said positioning means for contacting said glass and moving said positioning means to a non-contacted position when said supporting means is moved toward its home position.

5. The apparatus of claim 1 wherein the reciprocating means is a one revolution clutch.

6. The apparatus of claim 4 wherein the reciprocating means is a one revolution clutch.

References Cited

UNITED STATES PATENTS 3,102,627   9/1963   Acton     198—29
3,225,890   12/1965   Wiese     198—29

GERALD M. FORLENZA, Primary Examiner

G. F. ABRAHAM, Assistant Examiner

U.S. Cl. X.R.
198—33, 223